US012307626B2

(12) United States Patent
Peterson

(10) Patent No.: US 12,307,626 B2
(45) Date of Patent: May 20, 2025

(54) WARPING ARTWORK TO PERSPECTIVE CYLINDERS WITH BICUBIC PATCHES

(71) Applicant: Adobe Inc., San Jose, CA (US)

(72) Inventor: John Peterson, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 233 days.

(21) Appl. No.: 18/057,374

(22) Filed: Nov. 21, 2022

(65) Prior Publication Data

US 2024/0169477 A1 May 23, 2024

(51) Int. Cl.
*G06T 3/18* (2024.01)
*G06T 15/04* (2011.01)
*G06T 17/30* (2006.01)
*G06T 19/20* (2011.01)

(52) U.S. Cl.
CPC ............. *G06T 3/18* (2024.01); *G06T 15/04* (2013.01); *G06T 17/30* (2013.01); *G06T 19/20* (2013.01); *G06T 2219/2021* (2013.01)

(58) Field of Classification Search
CPC .......... G06T 3/18; G06T 15/04; G06T 17/30; G06T 19/20; G06T 2219/2021; G06T 15/20
See application file for complete search history.

(56) References Cited

U.S. PATENT DOCUMENTS

| | | | |
|---|---|---|---|
| 6,424,351 B1 * | 7/2002 | Bishop ................... | G06T 15/04 345/582 |
| 10,614,633 B2 * | 4/2020 | Schuneman ........ | G06F 3/04815 |
| 10,628,918 B2 | 4/2020 | Peterson | |
| 10,706,500 B2 | 7/2020 | Peterson et al. | |
| 10,832,376 B2 | 11/2020 | Peterson | |
| 2007/0211934 A1* | 9/2007 | Pan ......................... | G06V 10/24 382/154 |
| 2009/0041379 A1* | 2/2009 | Shih ........................ | G06T 3/06 382/276 |
| 2013/0162633 A1* | 6/2013 | Berger .................... | G09G 5/00 345/582 |
| 2018/0108183 A1* | 4/2018 | Schuneman .......... | G06F 3/0481 |
| 2018/0113595 A1* | 4/2018 | Ptak .................... | G06F 3/04845 |
| 2018/0197331 A1* | 7/2018 | Chen ...................... | G06T 19/20 |

(Continued)

OTHER PUBLICATIONS

Abi-Ezzi et al., "Fast Dynamic Tessellation of Trimmed NURBS Surfaces", 1994 (Year: 1994).*

(Continued)

*Primary Examiner* — Phong X Nguyen
(74) *Attorney, Agent, or Firm* — Nicholson De Vos Webster & Elliott LLP

(57) ABSTRACT

Embodiments are disclosed for warping artwork. The artwork is warped to fit an existing image of a cylinder. A method of warping artwork may include receiving a request to wrap an image onto a cylindrical surface. In response to the request, a set of adjacent warping patches are generated. The set of adjacent warping patches includes a first zero-width patch corresponding to a left edge of the image and a second zero-width patch corresponding to a right edge of the image. The image is mapped to the set of adjacent warping patches based on a viewing perspective of the cylindrical surface. User control handles are provided to adjust the warp to fit the existing image of the cylinder, including its position, curvature, and perspective.

20 Claims, 10 Drawing Sheets

(56) References Cited

U.S. PATENT DOCUMENTS

| | | | |
|---|---|---|---|
| 2020/0098086 A1* | 3/2020 | Peterson | G06T 11/60 |
| 2023/0074094 A1* | 3/2023 | Hertzmann | G06T 17/20 |
| 2024/0077426 A1* | 3/2024 | Deng | G01N 21/954 |
| 2024/0169477 A1* | 5/2024 | Peterson | G06T 15/04 |
| 2024/0278952 A1* | 8/2024 | Breu | B65G 47/244 |

OTHER PUBLICATIONS

Bier et al., Two-Part Texture Mapping, 1986 (Year: 1986).*
Ilic et al., Implicit Meshes for Effective Silhouette Handling, 2007 (Year: 2007).*
Fondevilla et al., Fashion Transfer: Dressing 3D Characters from Stylized Fashion Sketches, 2021 (Year: 2021).*
Böhm, W. et al., "A survey of curve and surface methods in CAGD," Computer Aided Geometric Design, vol. 1, Issue 1, 1984, pp. 1-60.

* cited by examiner

WARPING ARTWORK TO PERSPECTIVE CYLINDERS WITH BICUBIC PATCHES

BACKGROUND

Developers have created hardware and software platforms for creating and manipulating digital images. These platforms allow computing systems to manipulate digital images in a variety of ways to modify one or more characteristics and then save or share the edited digital images. Indeed, conventional systems can edit a raster image or vector image by warping or otherwise deforming the image via control points (e.g., in a Bézier patch or a Bézier curve) corresponding to the digital image. Changing a position of a control point in such a warping/deformation operation alters a digital image by stretching or compressing the image in connection with the positions of the group of control points.

The amount of processing expense required to perform a warping/deformation operation on a digital image largely depends on the complexity of the operation. Processing images using Bézier deformations according to conventional methods can become very processor intensive with higher-order deformation operations. For example, changing a position of a control point can cause an image editing application to calculate a deformation for a Bézier patch based on the degree of change of the position (or orientation) of the control point.

Additionally, more complex operations may require multiple resource intensive warping/deformation operations. For example, often when creating designs for packages it is necessary to wrap artwork onto a cylindrical surface, such as a can or a bottle. Distorting to the artwork to properly appear on a cylindrical surface requires several distortions. Not only must the art be curved to match the shape of the cylinder, but it must also exhibit perspective distortion so portions near the edge of the cylinder appear foreshortened relative to those at the center.

SUMMARY

Introduced here are techniques/technologies for generating cylinder warps for digital content. For example, in some embodiments, a cylinder warp tool is provided which uses adjacent warp patches to warp a digital image to fit a cylindrical surface, the warp patches can include two end warp patches of zero width and two middle warp patches. The zero width patches allow for content obscured by the edge of the cylinder to be hidden without destroying any content. Additionally, embodiments can identify a top and bottom curve to be applied to the middle warp patches to establish the initial shape of the warped image.

Further, user interface control handles are provided to enable the user to modify the warp shape and/or perspective. For example, control handles are created and associated with the middle warp patches. These control handles enable the user to set the position and size of the warp patches and adjust the curvature of the top and bottom edges of the warp patches. Additionally, a perspective control is provided allowing the user to adjust the perspective distortion applied to the image, making the image appear closer to, or farther from, the viewer.

Additional features and advantages of exemplary embodiments of the present disclosure are set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
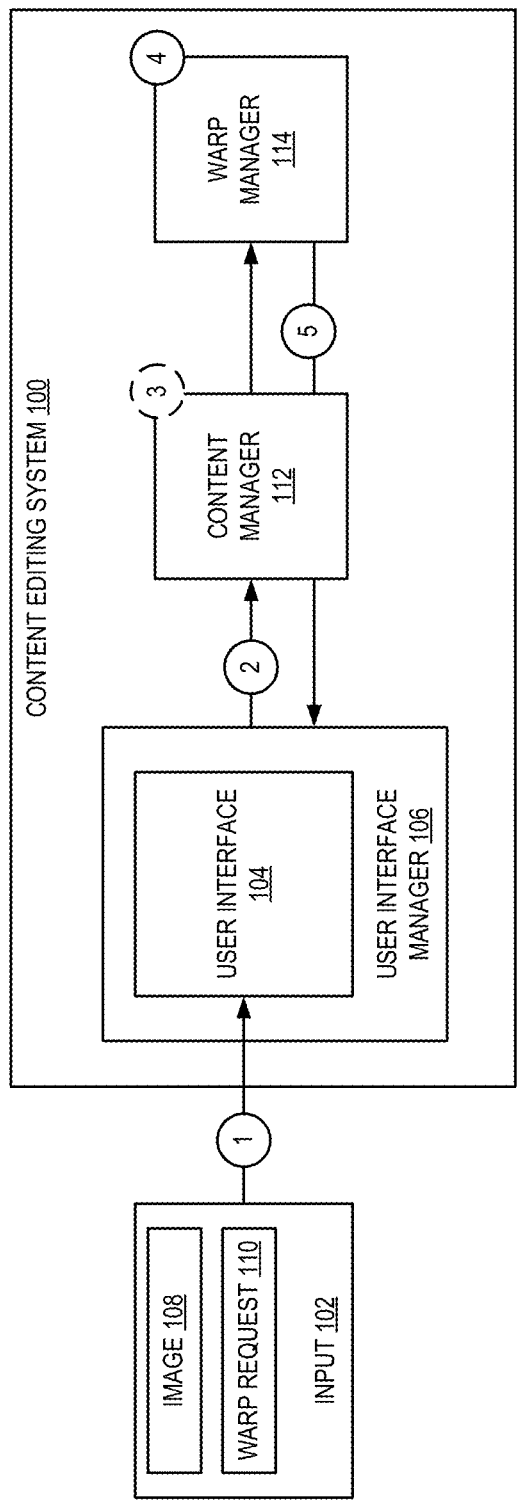
FIG. 1 illustrates a diagram of a process of warping artwork to perspective cylinders in accordance with one or more embodiments.

One or more embodiments of the present disclosure include a digital content editing system (or simply "content editing system") that performs piecewise deformation of digital content such as digital images (e.g., raster images or vector images) or digital text. Specifically, embodiments use bicubic patches to warp digital images to fit perspective cylinders within the content editing system using a simplified, intuitive interface. Prior attempts to fit artwork to perspective cylinders have required complex modeling software. For example, one prior approach uses 3D modeling software to texture map a label (or other digital image) onto a 3D cylindrical surface (e.g., a bottle, can, etc.). However, this requires a substantial amount of work to create the 3D models for the cylindrical object, provide lighting and camera information, etc. Often a designer does not have the appropriate background or skills required to perform 3D modeling or does not want to use a complex application to create a simple mock-up.

Another prior approach is to try to manually draw the label directly as it appears on the curved surface. However, approximating the curved path and correct perspective distortion is tedious and challenging. Similarly, other warping tools can be used to manipulate a 2D label into a cylindrical shape, but again, this is time-consuming and tedious.

Embodiments provide a system for creating a warp which, when applied to content (e.g., digital images, etc.), represents a mapping to fit a cylinder. This warp results in the correct curved path and perspective distortion without requiring the user to manually create it. Additionally, the warp and perspective can be intuitively modified within the user interface of the content editing system, enabling ordinary users (e.g., users without extensive 3D modeling experience) to match the warp to the desired cylinder dimensions and adjust the perspective of the warped artwork appropriately.

In some embodiments, in response to a request to warp digital content to fit a cylindrical surface, the content editing system creates a set of Bézier warping patches. These warping patches include a left patch and a right patch having zero width and two or more middle patches between the left and right patches. In some embodiments, the set of Bézier warping patches includes four patches: the left and right patches and two middle patches. Because the left and right patches are of zero width, any portions of the warped digital content that is mapped to these partitions is hidden without losing the content (e.g., if the designer changes the dimensions, then the portion mapped to the zero width patches can be remapped to the middle patches, etc.).

Once the warping patches have been created, a cylinder warp is applied to the digital content. In some embodiments, an initial default warp is applied, and a number of control handles are added which enable the user to adjust the curvature and perspective of the warp. The control handles are user editable controls which allow for the user to intuitively modify the warped content to fit the user's desired application (e.g., to fit a particular sized cylinder). For example, the user may be creating a mock-up of a label to be applied to a bottle, can, or other cylindrical object. Accordingly, the user may have both an image of the label (e.g., a flat image) and an image of the cylindrical object on a digital canvas of the content editing system. Once the cylindrical warp has been applied to the label, the user places the warped content onto the image of the cylindrical object on the digital canvas (e.g., drag and drop, tap and drag, etc.). Once aligned over the image of the cylindrical object, the user then adjusts the size, curvature, and perspective of the label to fit the image of the cylindrical object, using the control handles.

As such, embodiments enable users quickly and easily to create a cylindrical warp and adjust the warped image it to fit a desired cylinder within a content editing system. As this does not require the use of specialized modeling software, the user does not require any special skills to wrap the content around the cylinder. Additionally, the content creation and warping processes can all be performed within the same content editing system. This results in a simplified content creation pipeline, reducing time and resources spent iterating on a design project.

FIG. 1 illustrates a diagram of a process of warping artwork to perspective cylinders in accordance with one or more embodiments. A content editing system 100 enables users to warp artwork (e.g., digital content such as raster images, vector images, etc.) to fit a perspective cylinder. The content editing system 100 may be implemented a standalone application, as a module of an application, as a plug-in for applications as a library function or functions that may be called by other applications, and/or as a cloud-computing model.

As shown at numeral 1, a content editing system 100 can receive an input 102 (e.g., from a user, another system, etc.), via a user interface 104. In some embodiments, the content editing system includes a user interface manager 106 which enables the content editing system to display the user interface 104 as well as translate the user's interactions with the user interface 104 into one or more actions to be performed by the content editing system. For example, the content editing system may enable the user to create and edit digital content, such as raster images and vector images. To this end, the user interface 104 may include a digital canvas and provide various drawing tools that enable the user to create an image. Additionally, or alternatively, the user may provide an image 108 as input to the content editing system (e.g., by uploading the image to the content editing system, obtaining the image from an external service where the image is stored, etc.).

Once the image 108 has been obtained, the user can request that a cylinder warp be applied to the image. In some embodiments, this warp request 110 is communicated by selecting a cylinder warp element in user interface 104. Additionally, or alternatively, the cylinder warp request may be communicated by invoking a cylinder warp operation via other inputs, such as a command via a text interface, a voice command, a gesture, etc. In some embodiments, the warp request 110 may be inferred from the user's actions. For example, by placing the image 108 over a cylinder graphic object (e.g., a shape, etc.), an image of a cylindrical object, etc. the content editing system may automatically initiate a cylinder warp to the image 108.

Upon receiving the warp request 110, content manager 112 is invoked at numeral 2. Content manager 112 can communicate with the user interface manager 106 to ensure the digital content is properly displayed within user interface 104. The content manager 112 can manage raster and vector content. For vector images, this may include translating vector data (e.g., path/segment data, etc.) into pixel data for display. Likewise, for raster images, this may include mapping the raster data to the appropriate resolution of the user interface 104. In some embodiments, optionally at numeral 3, the content manager 112 can manage segmentation of raster or vector images as needed prior to passing the images to the warp manager 114. In such instances, the content manager 112 segments the images, the warp manager 114 warps each segment, and the content manager 112 recombines the segments to create the cylinder warped image before it is displayed on the user interface 104. Alternatively, if no segmentation is to be performed, the image may be passed to warp manager 114.

The warp manager 114 can perform a cylinder warp on the image 108. Specifically, the warp manager 114 can apply Bézier deformations on digital content. In particular, the warp manager 114 can generate a plurality of parametric patches (e.g., Bézier patches such as part of a Bézier quilt) for a plurality of separate portions of an image during a warp operation on a digital image or digital text. This can include two zero-width end patches and two or more middle patches. As discussed, the image can be mapped to the patches based on the perspective used for the cylinder warp. Once the cylinder warp has been applied, the warped image is output at numeral 5 and displayed in user interface 104. In some embodiments, the content manager can recombine portions of the warped image as needed, if the image was segmented prior to warping.

In some embodiments, the warp manager 114 can also receive input from the user via the user interface 104. This can include inputs generated from manipulation of one or more control handles added to the image 108 in the user interface 104. This allows for the user to modify the curvature of the warp (e.g., a top curvature and a bottom curvature of the image. Additionally, the inputs can include setting the top right corner and lower left corners of the warped image. Further, the user can adjust the perspective of the warp to make the image appear closer or farther away.

Figure 2:
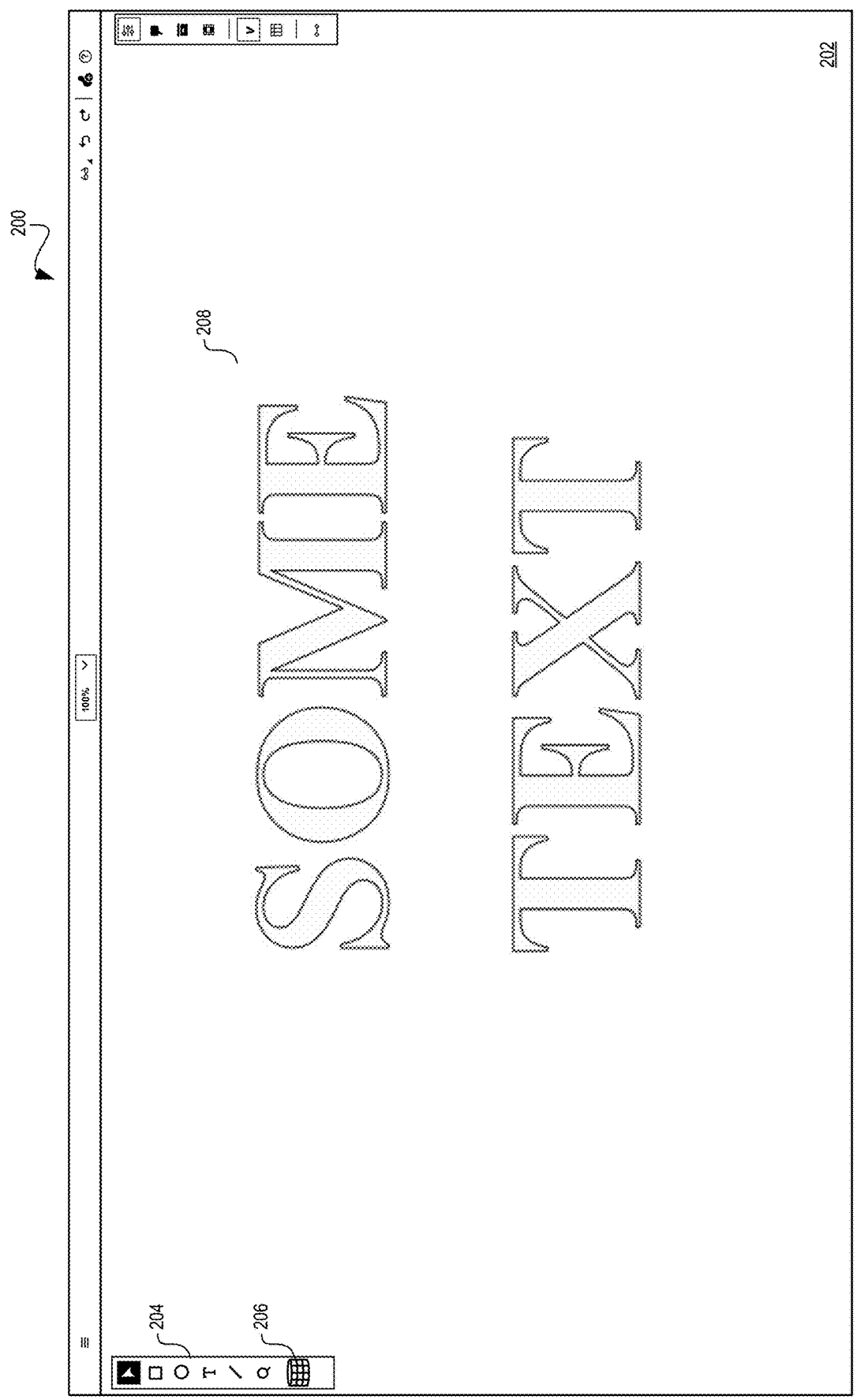
FIGS. 2 and 3 illustrate diagrams of warping artwork to perspective cylinders in accordance with one or more embodiments.
Figure 3:
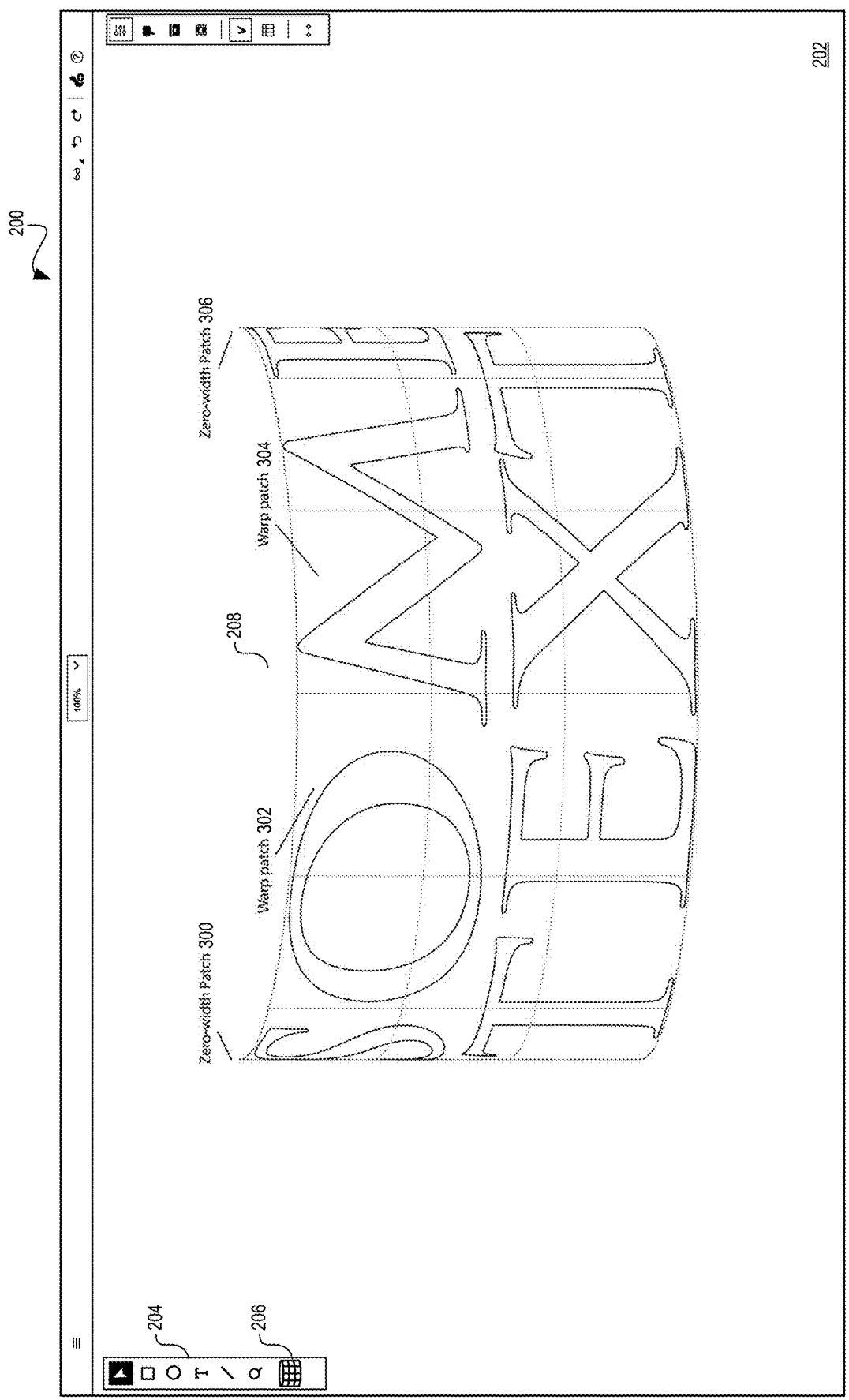

FIGS. 2 and 3 illustrate diagrams of warping artwork to perspective cylinders in accordance with one or more embodiments. As shown in FIG. 2, a user interface 200 can include a digital canvas 202 on which various artwork can be created and/or modified. The user interface 200 may be provided as part of a client application (such as an image editing application) executing on a client device (e.g., desktop computer, laptop computer, tablet computer, etc.). The digital canvas can include one or more tool panels 204 that include various drawing tools for use in creating and/or editing images on the digital canvas. In the example of FIG. 2, the tool panel 204 includes a cylinder warp tool that allows the user to perform a cylinder warp of artwork as described herein.

When the user selects the cylinder warp tool, the content editing system enables the user to select an image to be warped. In some embodiments, this includes selecting a particular image on the digital canvas. Alternatively, this may include selected a region of the digital canvas that may include one or more images. In the example of FIG. 2, the digital image 208 includes digital text displayed on a plurality of lines. While the digital image 208 includes text, it is understood that a digital image can include any digital image content as previously described. The cylinder warp tool thus causes the content editing system to perform a deformation operation that the user can apply to any type of digital image content.

Once the user has selected the cylinder warp tool and designated the region of the digital image 206 that the user wants to deform, the content editing system analyzes the region of the digital image 206 to determine the number of patches to be created. Embodiments implement techniques for creating and warping Bézier patches such as are described in U.S. Pat. Nos. 10,628,918, 10,706,500, and 10,832,376, each of which is hereby incorporated by reference for all purposes. In some embodiments, selected image 206 is divided into a plurality of portions corresponding to a parametric quilt including a plurality of two-dimensional parametric patches (e.g., Bézier patches or other spline-based surfaces) in adjacent portions of the digital content. For instance, the content editing system determines a deformation for digital content corresponding to each parametric patch in the quilt and deforms the individual portions of the digital content. In one or more embodiments, the content editing system then recombines the portions of the digital content. Using a digital quilt of multiple warping patches, the content editing system quickly and efficiently manipulates all or only a portion of a digital image, while providing a smooth transition to the remainder of the digital image.

In some embodiments, by default, the content editing system creates a Bézier quilt including four adjacent Bézier patches: two end patches and two middle patches. Alternatively, more or fewer middle patches may be included in the Bézier quilt. The Bézier patches may be of equal size (or approximately equal size) based on the size of the parametric quilt or based on a user input. Additionally, the patches include a plurality of control handles that allows a user to modify a shape and/or perspective of the patches.

Creating the four warp patches requires finding the silhouette edge of the cylinder from a given viewing distance, computing the perspective foreshortening given the viewing distance, and applying the curvature for the top and bottom. In some embodiments, default values for the viewing distance, perspective, and curvature may be applied to the warp patches. With the warp patches created, and the appropriate deformations applied to the warp patches, the image can be mapped to the warp patches. For example, as shown in FIG. 3, the warp patches 300-306 are created and the image 208 is mapped to the patches. In this example, portions of the 'S' and 'E' in 'SOME' are obscured by the cylinder edges. As discussed, these portions of the image 208 have been mapped to the zero-width patches 300 and 306, resulting in this mapped content being hidden. If the perspective is changed, resulting in more or less of the image content being obscured by the cylinder edges, then more or less content is mapped to the zero-width patches.

For example, the content editing system can divide the digital image into a plurality of portions corresponding to the Bézier patches. For instance, the content editing system splits the digital image along edges of the Bézier patches, so each parametric patch corresponds to a separate image portion. To illustrate, for raster images (e.g., a digital image defined by a plurality of pixels), in one or more embodiments the content editing system divides the raster images by generating adjoining sets of subdivided triangles that are mapped to pixels of the digital image. Regarding the vector images (e.g., a digital image defined by mathematical curves or lines), the content editing system slices vector segments along boundaries of Bézier patches to divide the vector image into different portions. Specifically, the content editing system determines whether a portion of a digital image falls within the boundaries of a given Bézier patch by analyzing the zero-crossing points of vector segments and storing a list of path slices.

Additionally, the Bézier patches can include a plurality of control points that define the shape of the patches. Of these control points, some may be visible and a user may manipulate them to modify the shape of the patches (these are referred to as "anchor control points"). Other control points for the patches may be hidden and not directly editable by the user. Additionally, control handles may be provided for the cylinder warp. The control handles provide a user interface for manipulating the cylinder warp, such as modifying its curvature, size, and/or perspective. The content editing system can receive an input to modify the cylinder warp based on a changed position of one of these control handles. In one or more embodiments, in response to a position change of a control handle, the content editing system deforms corresponding portion(s) of the image (e.g., by moving underlying control points associated with the patches). For instance, one control handle may control the bottom left of the warp, one control handle may control the upper right of the warp, other control handles may adjust the curvature of the top and bottom of the warp, and another control handle may adjust the perspective.

Figure 4:
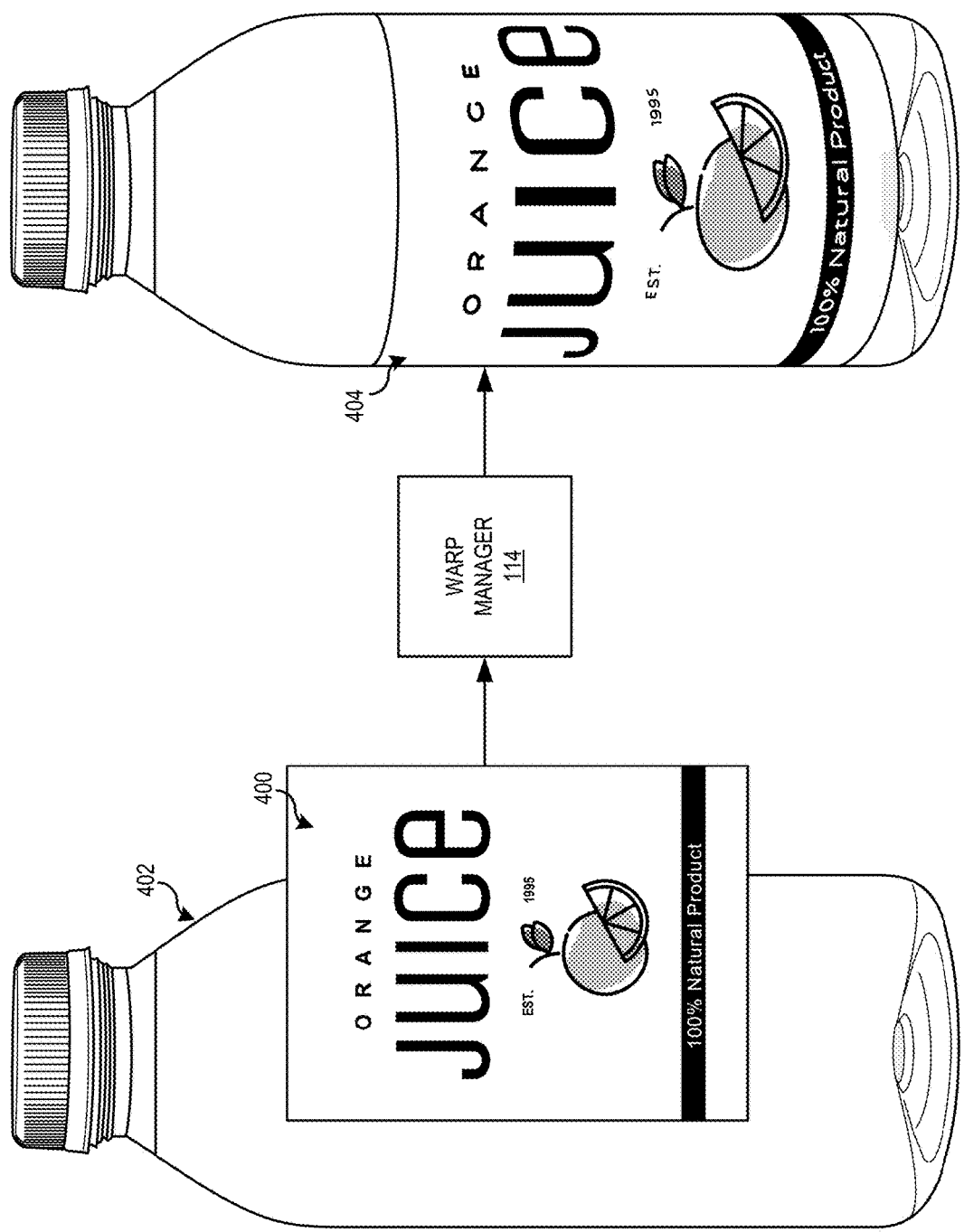
FIG. 4 illustrates an example artwork warped to fit an example perspective cylinder in accordance with one or more embodiments.

FIG. 4 illustrates an example artwork warped to fit an example perspective cylinder in accordance with one or more embodiments. As shown in FIG. 4, a user may wish to warp a digital image 400 to fit a cylinder 402. In the example of FIG. 4, an image representing an orange juice label 400 is warped to fit the image of a bottle 402. This may be performed as part of the label design process, during which the user may wish to view a representation of what the label may look like on a real bottle. As discussed, the user can select a cylinder warp tool and the image 400 to be warped. The image is then processed by the warp manager 114 to generate a warped image 404, as discussed herein. The user can then adjust the warped image as needed to fit the desired cylinder shape and perspective.

Figure 5:
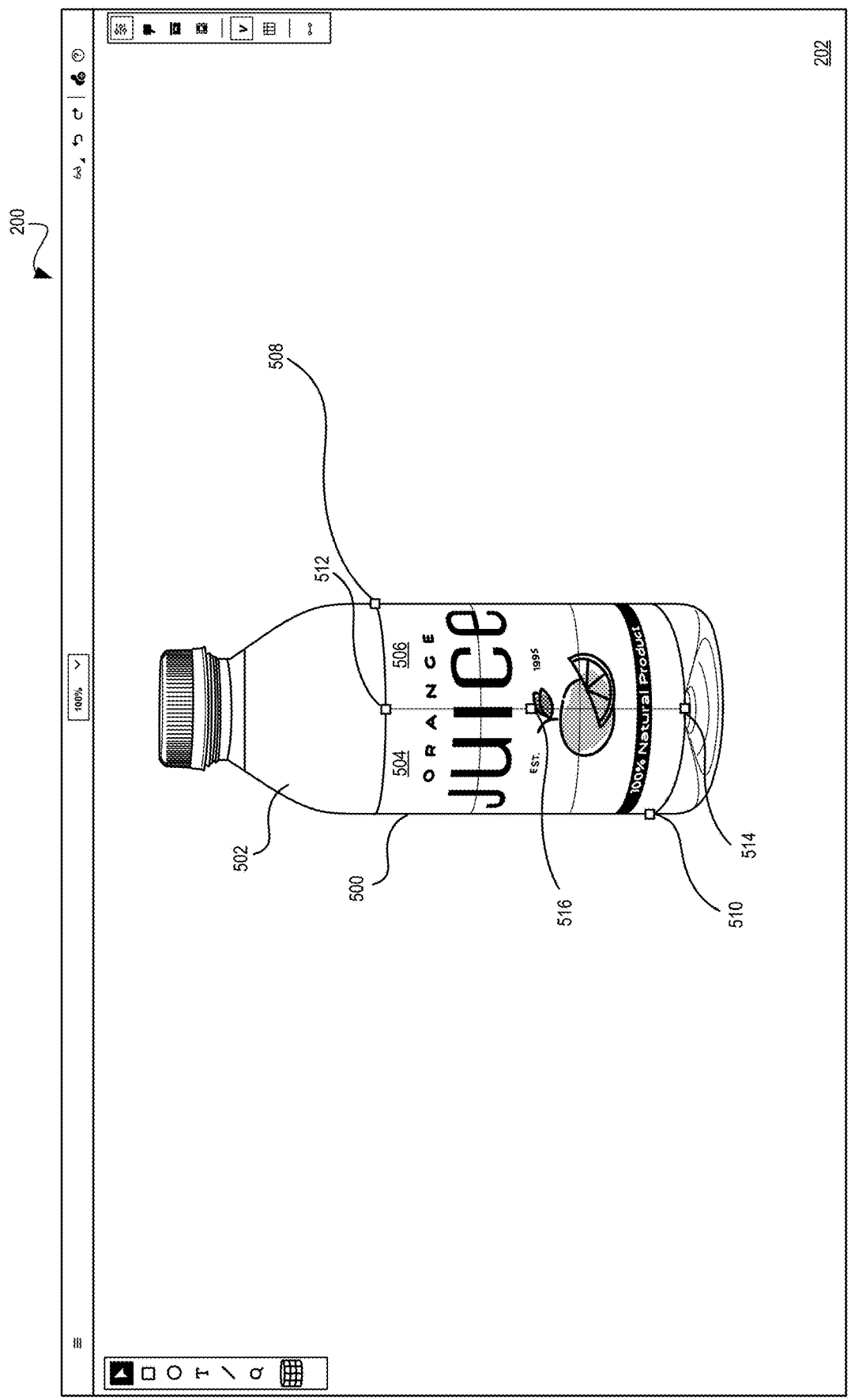
FIG. 5 illustrates an example user interface for warping artwork to fit an example perspective cylinder in accordance with one or more embodiments.

FIG. 5 illustrates an example user interface for warping artwork to fit an example perspective cylinder in accordance with one or more embodiments. As shown in FIG. 5, digital image 500 has been warped to fit cylinder 502. As discussed, this includes creating two end warp patches of zero width, and two middle warp patches 504, 506. The warp patches are associated with a number of control handles allowing for the modification of the shape of the warp patches and the perspective of the digital image mapped to the warp patches.

For example, the control handles at the bottom left 510 and top right 508 change the size and position of the label. When overlayed on the intended cylinder, this allows the user to readily adjust the size of the warped image to match the size of the cylinder. Additionally, control handle 512 at the center top of the warp patches adjusts the curvature of the top and bottom sides of the warp patches, giving an immediate intuitive feel for the shape created. This also ensures that the top and bottom curvature remains symmetric. Further, control handle 514 allows for the curvature of the bottom side of the warp patches to be adjusted independently of the top side, allowing for the curvature to be fine-tuned. Also, control handle 516 allows for the perspective of the artwork to be further modified, as discussed below.

In some embodiments, additional control handles may also be provided, such as applying texture to horizontal vs. vertical cylinders, or limiting the range of how far the artwork wraps around the cylinder. For brevity, the description here assumes the artwork wraps halfway around a vertical cylinder.

Figure 6:
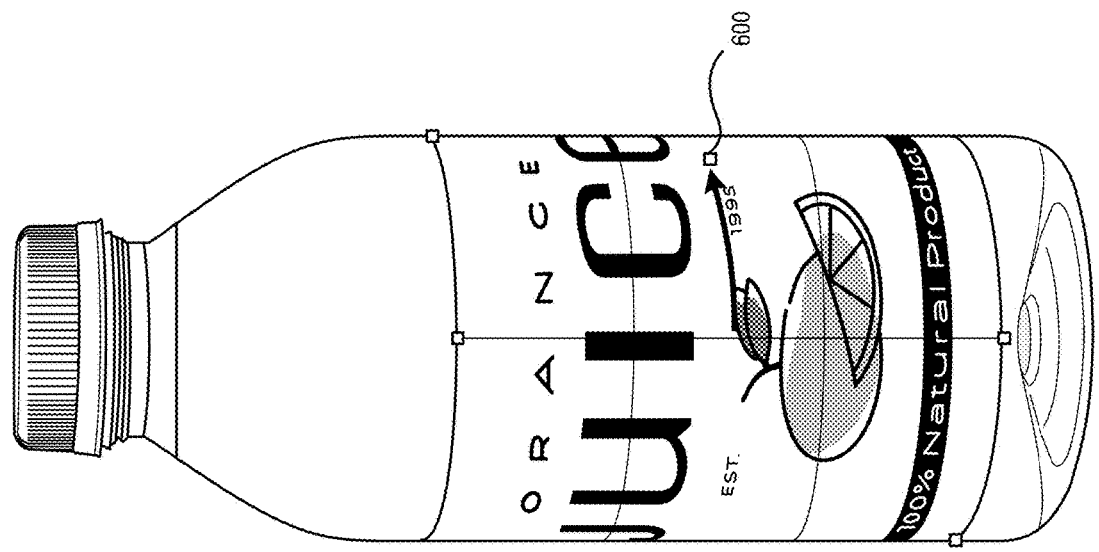
FIG. 6 illustrates an example of adjusting the perspective of the warped artwork in accordance with one or more embodiments.
Figure 6:
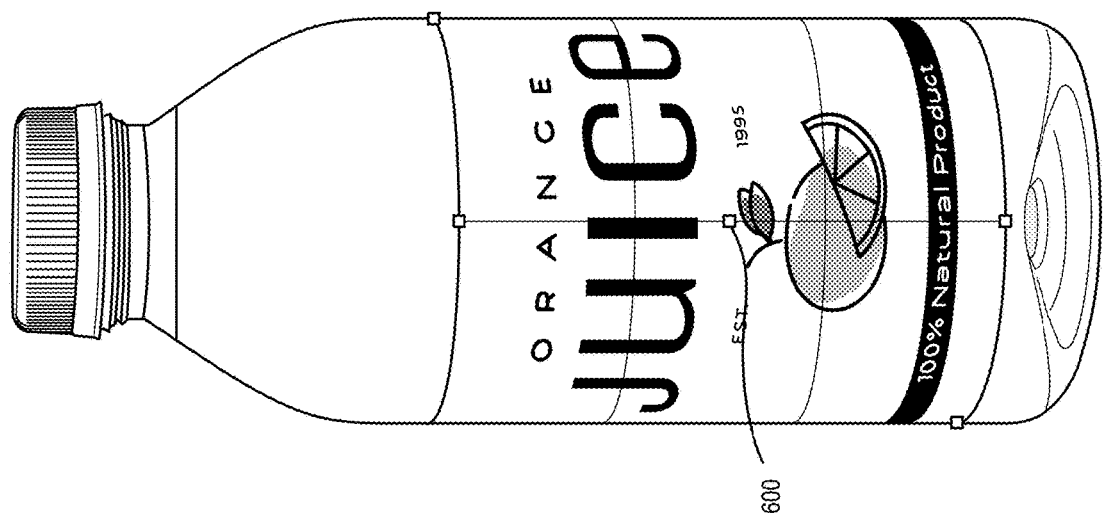

FIG. 6 illustrates an example of adjusting the perspective of the warped artwork in accordance with one or more embodiments. As discussed, the control handle 600 at the center of the warp patches adjusts the perspective distortion. When the control handle is near the center, it as if the viewer is far away, and little distortion is applied. As the control handle is moved to the edge, as shown at 602, the apparent view moves closer to the cylinder, and the perspective distortion becomes more pronounced. As a result, more of the digital image is mapped to the end patches, increasing the portions of the image that are obscured by the edges of the cylinder.

In some embodiments, if the control handle for adjusting the perspective is left linear, then it becomes very sensitive for the "near" adjustment and has limited effect further away. For the control handle to behave intuitively, the control handle should use an exponential interpolation. For example, if the focal length is given as a fraction t from r to 50r, then an exponential interpolation is used:

$$eerp(r, 50r, t)$$

where:

$$eerp(a, b, t) = a \cdot \left(\frac{b}{a}\right)^t$$

This provides a more natural control from the perspective of the user. Additionally, the value 50r is generally large enough to serve as an "infinite" distance from the cylinder for most design applications, however this value may vary depending on the application, user preferences, or other factors.

Figure 7:
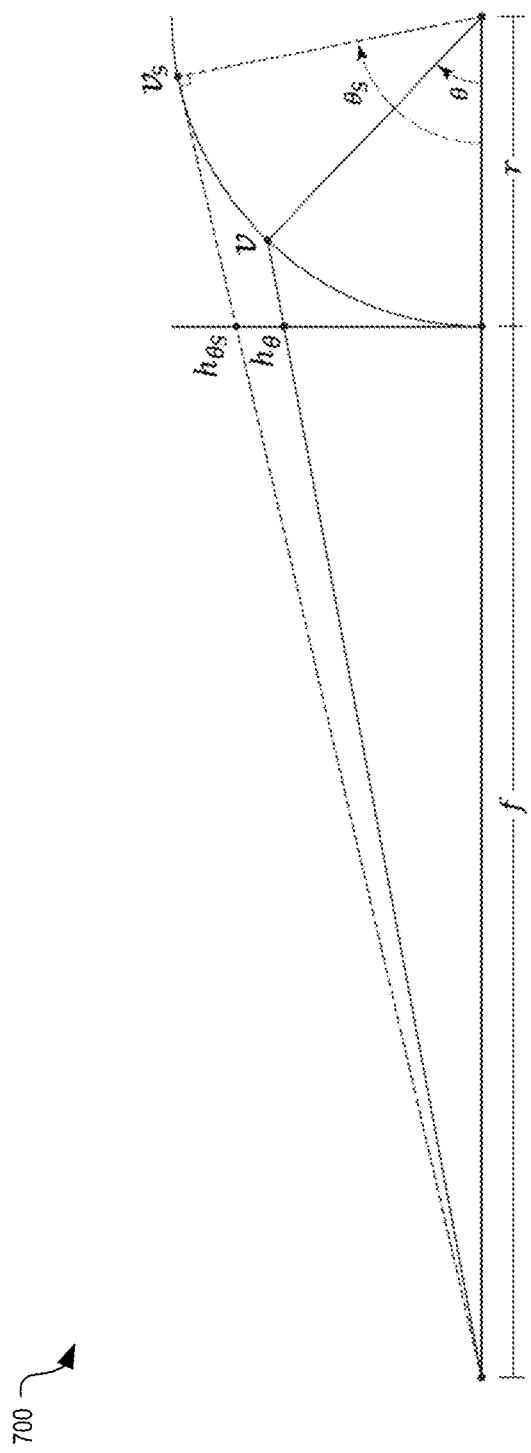
FIG. 7 illustrates a diagram for calculating perspective to warp artwork to perspective cylinders in accordance with one or more embodiments.

FIG. 7 illustrates a diagram for calculating perspective to warp artwork to perspective cylinders in accordance with one or more embodiments. The diagram of FIG. 7 is constructed as a top view, looking down on the cylinder from above. As discussed, during a cylinder warp operation, warp patches are created. These warp patches include the zero width end patches and two or more middle patches. Creating these patches requires finding the silhouette edge of the cylinder from a given viewing distance, computing the perspective foreshortening given the viewing distance, and applying a curvature for the top and bottom.

In some embodiments, this starts by creating a set of sample points for a 90° circular arc at regular angular steps, θ. These are first used to create a set of foreshortened positions from a front view, $h_θ$. The diagram 700 of FIG. 7 illustrates how to identify these points. Here, f is the distance from the viewer to the front of the cylinder, r is the radius of the cylinder and $h_θ$ are the foreshortened points as perceived at f distance away. At equal steps θ, these points are found with:

$$v = r \cdot \sin(\theta)$$

$$\frac{h_\theta}{v} = \frac{f}{f + r(1 - \cos\theta)}$$

$$h_\theta = \frac{f \cdot r \cdot \sin\theta}{f + r(1 - \cos\theta)}$$

If the distance f places the view relatively close to the cylinder, then a portion of the cylinder (and hence, of the mapped artwork) is hidden by the silhouette edge of the foreshortened cylinder. This angle $\theta_s$ is found with:

$$\theta_s = \frac{\pi}{2} - \sin^{-1}\frac{r}{f+r}$$

The points $x_i$, $y_i$ to create the path are found by starting with equal steps $\theta_i$ of θ from 0 to $\theta_s$. After using the angles $\theta_i$ to find the points $h_{\theta i}$, the $h_\theta$ points form the x coordinates across the cylinder quadrant. To find sample point coordinates for the Bézier curve segment, use:

$$x_i = h_{\theta i} + x_0$$

$$y_i = \sqrt{b^2\left(1 - \frac{(x_i - x_0)^2}{r^2}\right)} + y_0$$

Where $x_0$, $y_0$ are the center of the ellipse forming the top or bottom of the cylinder, b is the y distance from the centerline to the top (or bottom) of the elliptical curve, and r is the radius of the cylinder (as above).

Once the points are found, with the $x_i$ values incorporating the perspective foreshortening and the $y_i$ representing the curvature, a Bézier segment accurately representing this is found by approximation. The points $S_i = [x_i, y_i]$. If there are n pixel coordinates $S_{0 \ldots n}$, the cubic Bézier control points $P_{0 \ldots 3}$ are found via:

$$P = (B^T B)^{-1} * (B^T S)$$

Where B is a matrix of cubic Bézier coefficients for equally spaced points defined by:

$$u_i = \frac{i}{n-1}$$

$$B_j(u) = \frac{6}{j!(3-j)!} u^j (1-u)^{3-j}$$

$$B_{i,j} = B_j(u_i)$$

This is essentially a least-squares fitting method. Since the $B^T$ and $(B^T B)^{-1}$ matrices are constant for any n number of pixel coordinates, these matrices may be pre-computed or cached. This reduces the approximation to simple multiplyadd loops. Typically, eight samples (n=8) are enough to ensure an accurate Bézier approximation.

Once the basic Bézier segment is created, it can be reflected, translated, and scaled to create the top and bottom curves of the two middle patches as shown in FIG. 5. The source texture (e.g., the digital image being warped, such as image 400 in FIG. 4) is mapped across the cylinder from $\theta=0\ldots180°$.

However, if f is sufficiently short that some of the cylinder is obscured by the silhouette, then the patches are split at $\theta_s$ and $180°-\theta_s$, respectively. These patches at the edges are given zero width, so the cropped silhouette area becomes invisible. Using these zero-width patches has the advantage of maintaining all of the correct topology on any vector artwork in the cylinder warp, so it is still rendered properly without artifacts due to clipping the paths where the artwork is split by the patches.

In some embodiments, the zero-width patches at both sides are flagged, so that the user interface always moves their anchor control points together. If the patches are further split or edited these flagged anchor control points remain locked together, so the patches they represent remain invisible. This prevents the distracting behavior of the zero-width patches suddenly "opening up" and becoming visible if further editing is done on the warp.

Figure 8:
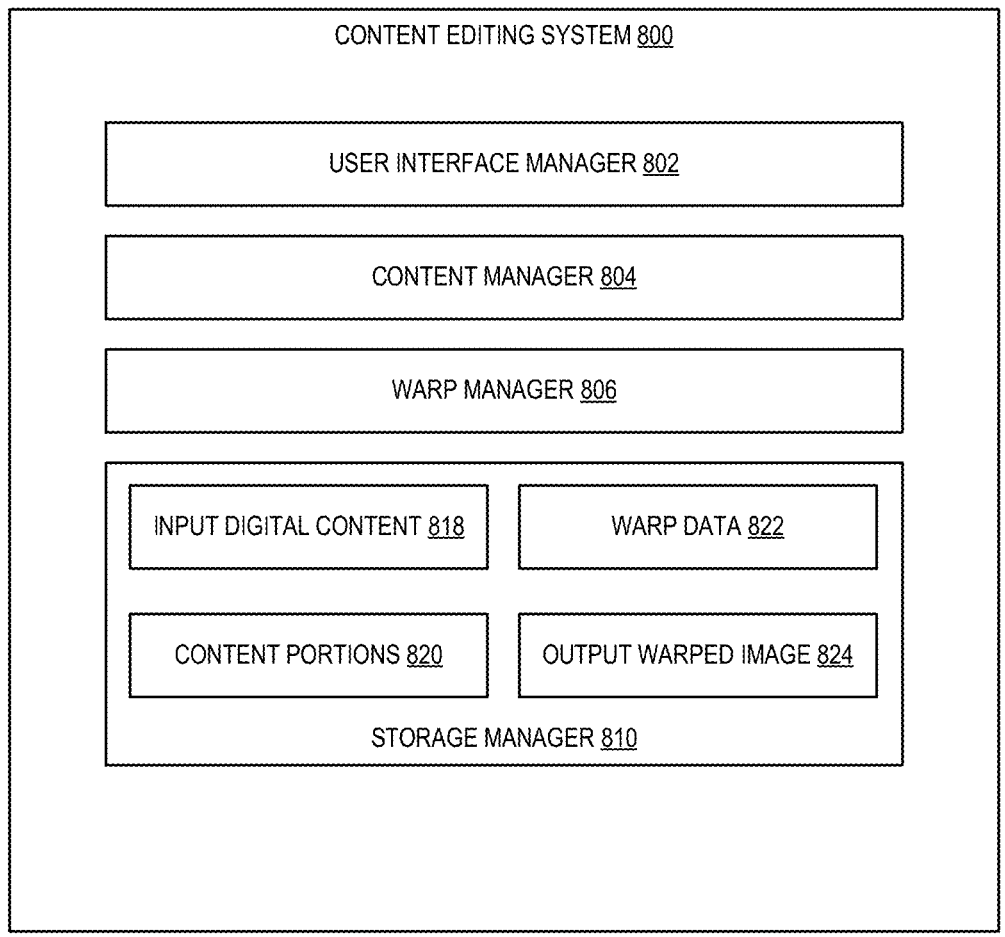
FIG. 8 illustrates a schematic diagram of a content editing system in accordance with one or more embodiments.

FIG. 8 illustrates a schematic diagram of content editing system (e.g., "content editing system" described above) in accordance with one or more embodiments. As shown, the content editing system 800 may include, but is not limited to, user interface manager 802, content manager 804, warp manager 806, and storage manager 810. The storage manager 810 includes input image 818, content portions 820, warp data 822, and output warped image 824.

As illustrated in FIG. 8, the content editing system 800 includes a user interface manager 802. The user interface manager 802 enables the generation and display of content within a user interface of one or more applications on a client device. Additionally, the user interface manager 802 allows a user to view and/or interact with digital content displayed in a user interface. For example, the user interface manager 802 enables users of an image editing application to interact with, and modify, digital content, such as by a cylinder warp to the digital content. As discussed, the tools or control handles can be displayed in a user interface of the image editing application to enable the user to input images or text into the image editing application, select a cylinder warp to be applied to the input image or text, and modify and/or fine tune the resulting warped image or text using control handles displayed in the user interface.

The content editing system 800 also includes a content manager 804 which is responsible for the management of digital content. The content manager 804 can manage processes for handling a variety of digital content by communicating with other components of the content editing system. For example, the content manager 804 can communicate with the user interface manager 802 to allow the user interface manager 802 to properly display digital content within a user interface. Additionally, the content manager 804 can communicate with the storage manager 810 to access digital content stored on the client device or on another device accessible via one or more networks.

In some embodiments, the content manager 804 manages raster content and vector content. In particular, the content manager enables the user interface manager 802 to display raster images within a pixel grid of (x, y) dimensions. Additionally, the content manager 804 can facilitate the segmentation of raster images in connection with a deformation operation and can assist warp manager 806 with applying warp operation(s) to a raster image or portions thereof. Similarly, the content manager 804 can allow the user interface manager 802 to display vector images based on characteristics applied to vector paths/segments. For instance, the content manager 804 can translate end point and direction information into pixel coordinates on a display device for the user interface manager 802. The content manager 804 can also facilitate segmentation of vector portions during a warp operation by performing mathematical calculations for finding locations of vector segments within regions being warped. Likewise, the content manager 804 can facilitate recombination of a plurality of vector segments according to predefined tolerances in response to a request to apply a cylinder warp to an input image.

The content editing system 800 also includes a warp manager 806 to facilitate the operation of Bézier deformations on digital content. Specifically, the warp manager 806 can generate a plurality of parametric patches (e.g., Bézier patches part of a Bézier quilt) for a plurality of separate portions of an image during a cylinder warp operation on a digital image or digital text. The warp manager 806 can also communicate with other components of the content editing system 800 to modify the cylinder warp applied to the image based on user inputs received through a user interface provided by the user interface manager. As discussed above, the user inputs may be received via the manipulation of one or more control handles associated with the warp patches.

As illustrated in FIG. 8, the content editing system 800 also includes the storage manager 810. The storage manager 810 maintains data for the content editing system 800. The storage manager 810 can maintain data of any type, size, or kind as necessary to perform the functions of the content editing system 800. For example, the storage manager 810 can include a database that stores input digital content 818 (e.g., digital images or digital text), content portions 820 corresponding to parametric patches in a warp operation, warp data 822 corresponding to the warp operations applied to the patches, and an output warped image 824. In some embodiments, the storage manager 810 can store information associated with recombining the portions, including any deformations, to create the warped image 824. The storage manager 810 can then store the warped digital image 824.

Each of the components 802-810 of the content editing system 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the content editing system 800 can cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Furthermore, the components 802-810 of the content editing system 800 may, for example, be implemented as one or more stand-alone applications, as one or more modules of an application, as one or more plug-ins, as one or more library functions or functions that may be called by other applications, and/or as a cloud-computing model. Thus, the components 802-810 of the content editing system 800 may be implemented as a stand-alone application, such as a desktop or mobile application. Furthermore, the components 802-810 of the content editing system 800 may be implemented as one or more web-based applications hosted on a remote server. Alternatively, or additionally, the components of the content editing system 800 may be implemented in a suite of mobile device applications or "apps."

As shown, the content editing system 800 can be implemented as a single system. In other embodiments, the content editing system 800 can be implemented in whole, or in part, across multiple systems. For example, one or more functions of the content editing system 800 can be performed by one or more servers, and one or more functions of the content editing system 800 can be performed by one or more client devices. The one or more servers and/or one or more client devices may generate, store, receive, and transmit any type of data used by the content editing system 800, as described herein.

In one implementation, the one or more client devices can include or implement at least a portion of the content editing system 800. In other implementations, the one or more servers can include or implement at least a portion of the content editing system 800. For instance, the content editing system 800 can include an application running on the one or more servers or a portion of the content editing system 800 can be downloaded from the one or more servers. Additionally or alternatively, the content editing system 800 can include a web hosting application that allows the client device(s) to interact with content hosted at the one or more server(s).

For example, upon a client device accessing a webpage or other web application hosted at the one or more servers, in one or more embodiments, the one or more servers can provide access to an image editing application. The client device can upload one or more digital images (e.g., the input image 818, such as camera roll or an individual's personal photos, etc.) stored on the client device. Moreover, the client device can provide a request (i.e., via user input) to the one or more servers to perform a cylinder warp operation on the input images. Upon receiving the request, the one or more servers can automatically perform the methods and processes described above to warp the provided images. The one or more servers can provide the warped image(s) to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 10. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 10.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 10.

Figure 9:
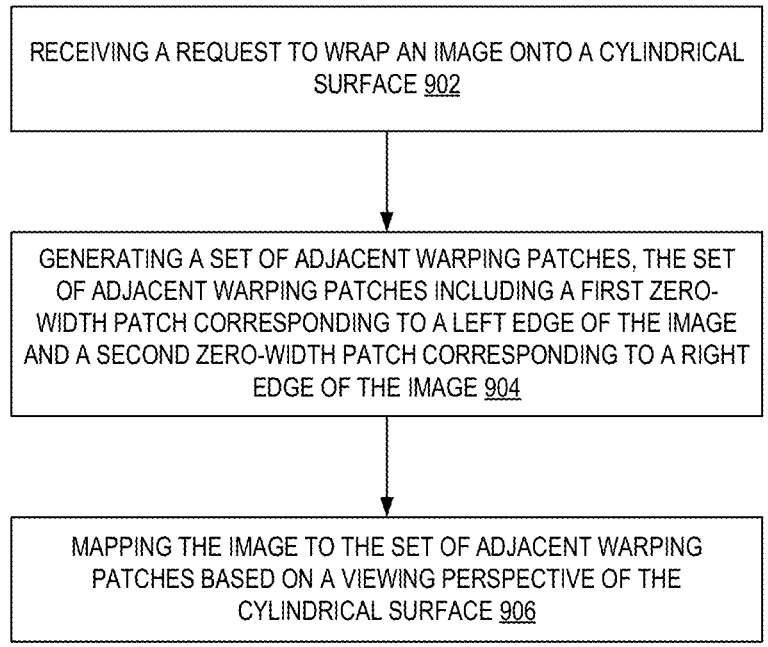
FIG. 9 illustrates a flowchart of a series of acts in a method of warping artwork to perspective cylinders in accordance with one or more embodiments.

FIGS. 1-8, the corresponding text, and the examples, provide a number of different systems and devices to enable warping of artwork to fit a cylindrical surface. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of warping artwork to perspective cylinders in accordance with one or more embodiments. In one or more embodiments, the method 900 is performed in a digital medium environment that includes the content editing system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a request to wrap an image onto a cylindrical surface. As discussed, the user may interact with a user interface of a content editing system. In some embodiments, the content editing system may be implemented as an image editing application executing on a client device (e.g., desktop computer, laptop computer, tablet computer, etc.). The user can create or otherwise obtain an image to be warped and can select a cylinder warp tool through the user interface. In some embodiments, upon selecting the cylinder warp tool, the user can then select the image or portions of an image or images to be warped. In some embodiments, the content editing system can apply a cylinder warp automatically to the image the user most recently interacted with prior to selecting the cylinder warp tool.

As illustrated in FIG. 9, the method 900 also includes an act 904 of generating a set of adjacent warping patches, the set of adjacent warping patches including a first zero-width patch corresponding to a left edge of the image and a second zero-width patch corresponding to a right edge of the image. In some embodiments, generating the set of adjacent warping patches can include adding a plurality of control handles to the set of adjacent warping patches, the control handles used to modify the set of adjacent warping patches. This enables the user to modify the shape of the warped image, e.g., to fine tune the warp to match a particular cylinder shape.

In some embodiments, the plurality of control handles includes a first control handle to control a top side and bottom side curvature and a second control handle to control the bottom side curvature. In some embodiments, the plurality of control handles includes a first control handle to control a top right position of the set of adjacent warping patches and a second control handle to control a bottom left position of the set of adjacent warping patches. In some embodiments, the plurality of control handles includes a control handle to adjust a perspective distortion of the image.

As discussed, the control handles are used to modify the shape and/or position of the warping patches. For example, the operations may further include receiving a request to modify the set of adjacent warping patches using at least one of the plurality of control handles, determining a first position of the at least one control handle, determining a second position of the at least one control handle, and modifying the set of adjacent warping patches based on a difference between the first position and the second position.

As illustrated in FIG. 9, the method 900 also includes an act 906 of mapping the image to the set of adjacent warping patches based on a viewing perspective of the cylindrical surface. In some embodiments, the image is mapped to the patches based on the viewing perspective. For example, depending on the viewing perspective some portions of the image would be obscured by the edges of the cylinder. Accordingly, in some embodiments, mapping the image can include determining a silhouette edge of the cylindrical surface based on a viewing distance from the cylindrical surface and mapping portions of the image obscured by the silhouette edge to the first and second zero-width patches.

In some embodiments, generating a set of adjacent warping patches can include sampling a set of points for a circular arc at a plurality of angular steps to determine a set of foreshortened positions, determining coordinates of a path forming a top or bottom curve of the set of adjacent warping patches using the set of points, and generating a Bézier segment using the coordinates. The Bézier segment can be used to determine the top and bottom curves of the warping patches using one or more transforms (e.g., reflections, translations, scales, etc.). For example, in some embodiments, the operations further include creating a top curve and a bottom curve of the set of adjacent warping patches using the Bézier segment and one or more transforms.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
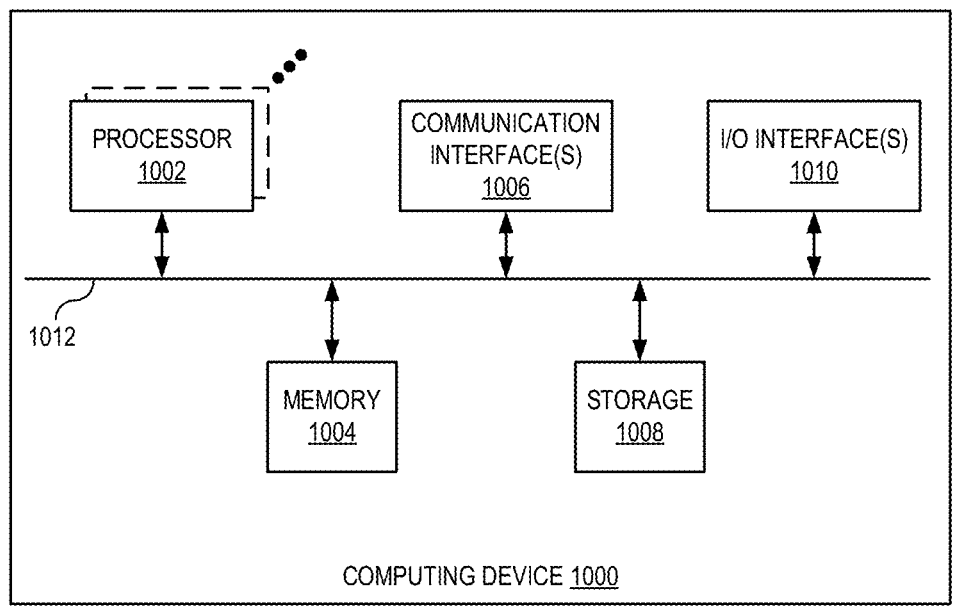
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the content editing system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A method comprising:
   receiving a request to wrap an image onto a cylindrical surface;
   generating a set of adjacent warping patches, the set of adjacent warping patches including a first zero-width patch corresponding to a left edge of the image and a second zero-width patch corresponding to a right edge of the image;
   determining a silhouette edge of the cylindrical surface; and
   mapping the image to the set of adjacent warping patches, wherein portions of the image that are obscured by the silhouette edge are mapped to the first or second zero-width patches.

2. The method of claim 1, wherein generating a set of adjacent warping patches, the set of adjacent warping patches including a first zero-width patch corresponding to a left edge of the image and a second zero-width patch corresponding to a right edge of the image, further comprises:
   adding a plurality of control handles to the set of adjacent warping patches, the control handles used to modify the set of adjacent warping patches.

3. The method of claim 2, wherein the plurality of control handles includes a first control handle to control a top side and bottom side curvature and a second control handle to control the bottom side curvature.

4. The method of claim 2, wherein the plurality of control handles includes a first control handle to control a top right position of the set of adjacent warping patches and a second control handle to control a bottom left position of the set of adjacent warping patches.

5. The method of claim 2, wherein the plurality of control handles includes a control handle to adjust a perspective distortion of the image.

6. The method of claim 2, further comprising:
   receiving a request to modify the set of adjacent warping patches using at least one of the plurality of control handles;
   determining a first position of the at least one control handle;
   determining a second position of the at least one control handle; and
   modifying the set of adjacent warping patches based on a difference between the first position and the second position.

7. The method of claim 1, wherein
   the silhouette edge of the cylindrical surface is determined based on a viewing distance from the cylindrical surface.

8. The method of claim 1, wherein generating a set of adjacent warping patches, the set of adjacent warping patches including a first zero-width patch corresponding to a left edge of the image and a second zero-width patch corresponding to a right edge of the image, further comprises:
   sampling a set of points for a circular arc at a plurality of angular steps to determine a set of foreshortened positions;
   determining coordinates of a path forming a top or bottom curve of the set of adjacent warping patches using the set of points; and
   generating a Bézier segment using the coordinates.

9. The method of claim 8, further comprising:
   creating a top curve and a bottom curve of the set of adjacent warping patches using the Bezier segment and one or more transforms.

10. A non-transitory computer-readable medium storing executable instructions, which when executed by a processing device, cause the processing device to perform operations comprising:
    receiving a request to wrap an image onto a cylindrical surface;
    generating a set of adjacent warping patches, the set of adjacent warping patches including a first zero-width patch corresponding to a left edge of the image and a second zero-width patch corresponding to a right edge of the image;
    determining a silhouette edge of the cylindrical surface; and
    mapping the image to the set of adjacent warping patches, wherein portions of the image that are obscured by the silhouette edge are mapped to the first or second zero-width patches.

11. The non-transitory computer-readable medium of claim 10, wherein the operation of generating a set of adjacent warping patches, the set of adjacent warping patches including a first zero-width patch corresponding to a left edge of the image and a second zero-width patch corresponding to a right edge of the image, further comprises:
    adding a plurality of control handles to the set of adjacent warping patches, the control handles used to modify the set of adjacent warping patches.

12. The non-transitory computer-readable medium of claim 11, wherein the plurality of control handles includes a first control handle to control a top side and bottom side curvature and a second control handle to control the bottom side curvature.

13. The non-transitory computer-readable medium of claim 11, wherein the plurality of control handles includes a first control handle to control a top right position of the set of adjacent warping patches and a second control handle to control a bottom left position of the set of adjacent warping patches.

14. The non-transitory computer-readable medium of claim 11, wherein the plurality of control handles includes a control handle to adjust a perspective distortion of the image.

15. The non-transitory computer-readable medium of claim 11, wherein the executable instructions, when executed by the processing device, cause the processing device to perform operations further comprising:
    receiving a request to modify the set of adjacent warping patches using at least one of the plurality of control handles;
    determining a first position of the at least one control handle;
    determining a second position of the at least one control handle; and
    modifying the set of adjacent warping patches based on a difference between the first position and the second position.

16. The non-transitory computer-readable medium of claim 10, wherein the
silhouette edge of the cylindrical surface is determined based on a viewing distance from the cylindrical surface.

17. The non-transitory computer-readable medium of claim 10, wherein the operation of generating a set of adjacent warping patches, the set of adjacent warping patches including a first zero-width patch corresponding to a left edge of the image and a second zero-width patch corresponding to a right edge of the image, further comprises:
sampling a set of points for a circular arc at a plurality of angular steps to determine a set of foreshortened positions;
determining coordinates of a path forming a top or bottom curve of the set of adjacent warping patches using the set of points; and
generating a Bézier segment using the coordinates.

18. The non-transitory computer-readable medium of claim 17, wherein the executable instructions, when executed by the processing device, cause the processing device to perform operations further comprising:
creating a top curve and a bottom curve of the set of adjacent warping patches using the Bezier segment and one or more transforms.

19. A system comprising:
a memory component; and
a processing device coupled to the memory component, the processing device to perform operations comprising:
receiving a request to wrap an image onto a cylindrical surface;
generating a set of adjacent warping patches, the set of adjacent warping patches including a first zero-width patch corresponding to a left edge of the image and a second zero-width patch corresponding to a right edge of the image;
determining a silhouette edge of the cylindrical surface; and
mapping the image to the set of adjacent warping patches, wherein portions of the image that are obscured by the silhouette edge are mapped to the first or second zero-width patches.

20. The system of claim 19, wherein the operation of generating a set of adjacent warping patches, the set of adjacent warping patches including a first zero-width patch corresponding to a left edge of the image and a second zero-width patch corresponding to a right edge of the image, further comprises:
adding a plurality of control handles to the set of adjacent warping patches, the control handles used to modify the set of adjacent warping patches.

* * * * *